United States Patent [19]
Wiltshire et al.

[11] 4,133,442
[45] Jan. 9, 1979

[54] TANK CLOSURE ASSEMBLY

[75] Inventors: Arthur J. Wiltshire, Richmond Heights; Harry R. Nara, Novelty; Edward T. LeBreton, Mentor; Ward L. Bliley, Chesterland, all of Ohio

[73] Assignee: Structural Fibers, Inc., Chardon, Ohio

[21] Appl. No.: 754,830

[22] Filed: Dec. 27, 1976

[51] Int. Cl.² .................. B65D 7/02; B65D 45/32
[52] U.S. Cl. ................................ 220/5 R; 220/5 A; 220/319
[58] Field of Search .............. 220/5 R, 5 A, 3, 319, 220/320, 4 R, 4 B, 4 E, 4 F, 85 R

[56] References Cited
U.S. PATENT DOCUMENTS

| 1,376,216 | 4/1921 | Mittinger | 220/5 R |
| 2,652,147 | 9/1953 | Jenkins et al. | 220/5 R X |
| 2,709,524 | 5/1955 | Russell et al. | 220/5 R X |
| 2,756,893 | 7/1956 | Barrere | 220/5 R |
| 2,952,378 | 9/1960 | Renslow | 220/5 A |
| 3,043,465 | 7/1962 | Horner | 220/5 A |
| 3,193,129 | 7/1965 | Pflüger et al. | 220/5 R |
| 3,357,594 | 12/1967 | Grosh et al. | 220/5 A X |
| 4,024,979 | 5/1977 | Craig et al. | 220/5 R X |

Primary Examiner—William Price
Assistant Examiner—Steven M. Pollard
Attorney, Agent, or Firm—McNenny, Pearne, Gordon, Gail, Dickinson & Schiller

[57] ABSTRACT

A tank closure assembly adapted to releasably couple tank sections formed by transversely splitting an integral bag-molded fiber-reinforced tank. The assembly includes external circumferential flanges secured to the tank sections adjacent their severed faces and in opposed relation to each other. An O-ring seal, disposed externally of the tank sections and between the flanges, is compressed into sealing engagement with surrounding surfaces, by tightening of a circumferential band encircling the flanges, to seal the tank sections at their plane of separation. A method of machining a tank to simultaneously form the split sections and suitable flange receiving grooves thereon is disclosed, as well as a method of pressure-testing the machined tank sections prior to assembly of the flanges and O-ring seal.

13 Claims, 13 Drawing Figures

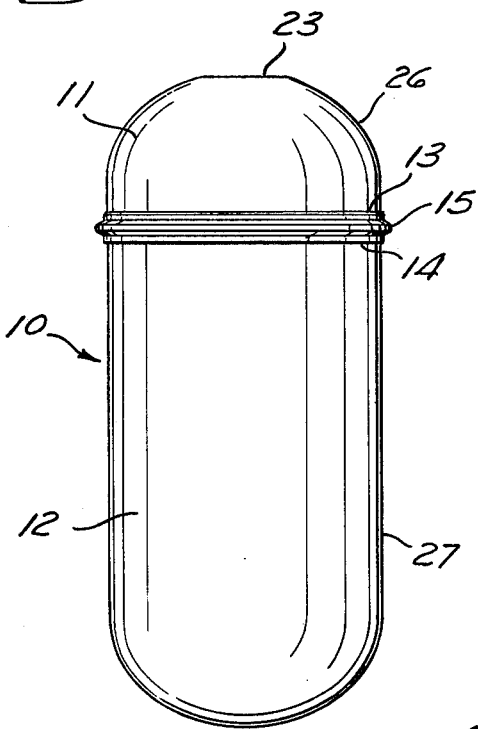
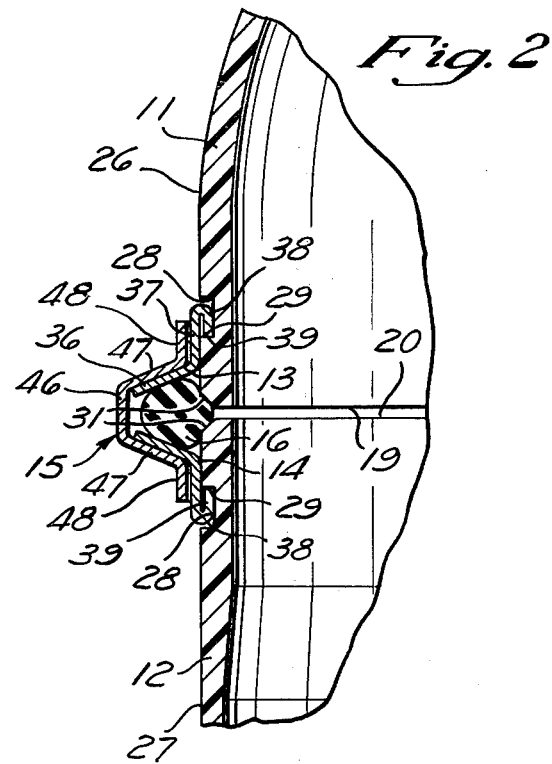
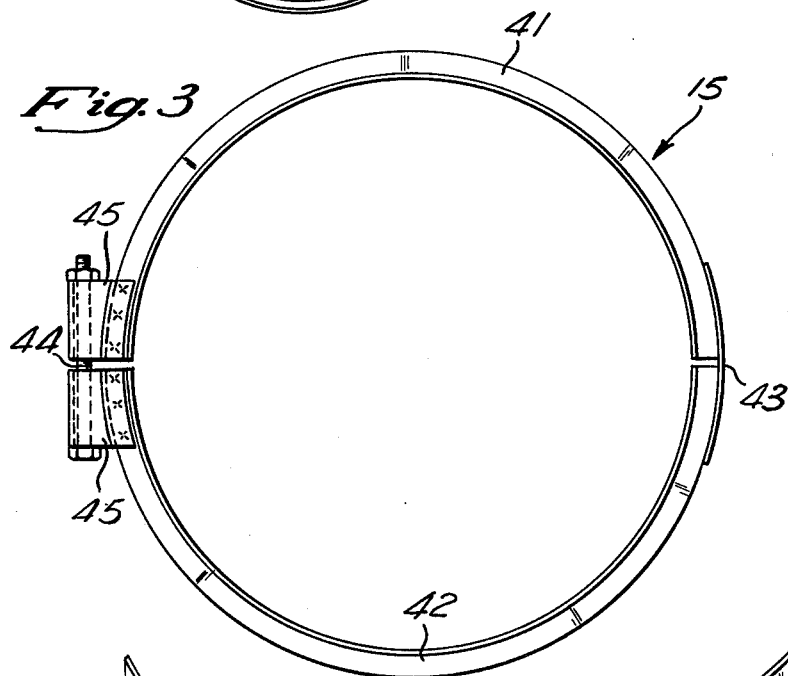
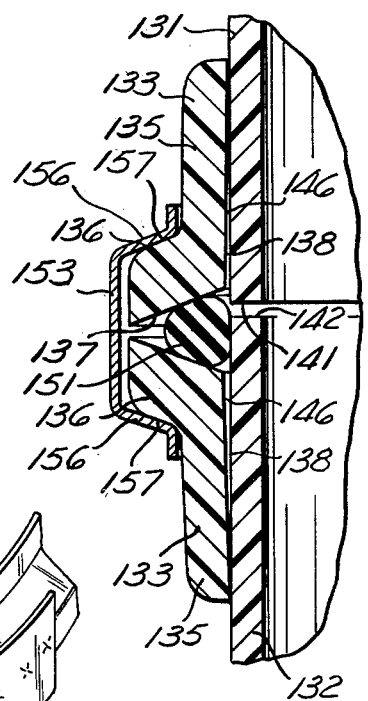
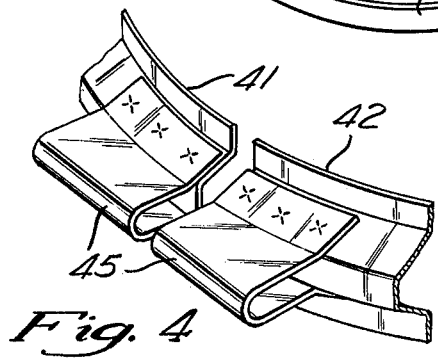
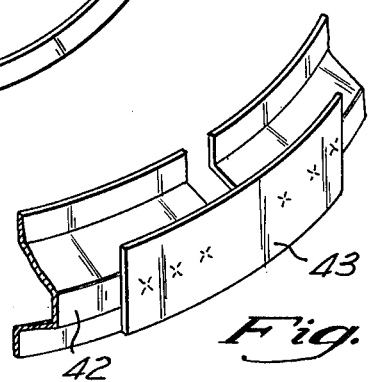

TANK CLOSURE ASSEMBLY

BACKGROUND OF THE INVENTION

The invention relates to pressure vessels and their manufacture, and in particular relates to a split tank closure assembly.

DESCRIPTION OF THE PRIOR ART

Bag-molded fiberglass-reinforced tanks are disclosed, for example, in U.S. Pat. No. Re. 25,241 to Randolph and U.S. Pat. No. 3,138,507 to Wiltshire. Split tank assemblies of the general class to which the present invention is directed are shown in U.S. Pat. Nos. 2,709,924 to Russell et al and 3,388,823 to Fleming et al, for instance. Split tanks of the type herein disclosed provide full access to the interior of the tank for placement and removal of rigid filter elements therein and various other purposes. In the known prior art, there is an absence of applications of bag-molded fiber-reinforced tanks, with their attendant manufacturing economies and other advantages, in the field of split tank assemblies.

SUMMARY OF THE INVENTION

The invention is directed to a split tank assembly and the method of its manufacture, wherein a generally conventional bag-molded, fiber-reinforced tank is transversely sectioned and fitted on each section with supplemental circumferential flanges adjacent the plane of separation.

In a first embodiment, a pair of mating tank sections are each provided with external flange receiving grooves adjacent their open faces and with flanges that include portions mechanically interlocked on the grooves. The plane of separation between the open tank faces is sealed by an O-ring disposed on the exterior of the tank sections between the opposed flanges. The flanges are advantageously formed of sheet metal stock, and include conical skirt portions flaring forwardly and outwardly from interlocked groove-engaging portions. In assembly, the conical skirt portions are clasped by complementarily shaped sides of an encircling split band. Circumferential tightening of the band causes its sides to wedge the flanges axially together, resulting in axial compression of the O-ring. This axial compression forces the O-ring to constrict radially and effectively seal against the sidewall surfaces of the tank sections.

The invention includes a method of severing an integrally molded tank into a pair of mating sections simultaneously with the formation of the flange-receiving grooves and O-ring seating surfaces. The method comprehends the use of a specially formed cutting tool in a single operation which minimizes dimensional variation of the relative positions of the flange grooves and sealing surfaces. The resulting dimensional uniformity advantageously avoids the necessity of remating only the original sections of a common tank so that tank sections may be randomly stored and assembled. In addition, a method of pressure testing the structural integrity of the severed tank sections and the quality of the sealing surfaces is disclosed.

In another embodiment of the invention, mating tank sections are fabricated by severing integrally molded units, as above disclosed, while, by contrast, they are provided with fiber-reinforced plastic flanges bonded on their exterior surfaces. As before, an O-ring is disposed at the mating faces of the tank sections externally of the tank wall sections between opposed flanges. The disclosed flange structure is arranged to permit the O-ring to effect a seal on the flange surfaces to avoid the necessity of machining or other surface preparation on the main bodies of the tank sections. The flange structure, in addition, affords high seal reliability by allowing the contact sealing force of the O-ring to be increased by pressure contained in the tank. The fiber-reinforced plastic flanges are circumferentially continuous rings having a tank section receiving bore. The bore is slightly tapered to direct and control movement of a bonding agent therein when the flange is slipped over a tank section which has been locally precoated with the bonding agent. The resulting bonded joint, moreover, has improved strength by virtue of a wedge-locking action between the tapered bore and hardened bonding medium. An additional advantage of this embodiment is its all plastic construction, which eliminates corrosion problems resulting from attack by materials carried in the tank or in the surrounding environment.

BRIEF DESCRIPTION OF THE DRAWINGS

FIG. 1 is an elevational view of a split tank assembly constructed in accordance with the principles of the invention;

FIG. 2 is a fragmentary, cross sectional view of a tank wall area at a plane of separation of a pair of mating tank sections on a somewhat enlarged scale;

FIG. 3 is a plan view of a split band subassembly used in the tank assembly of FIG. 1;

FIG. 4 is a fragmentary, perspective view of one side of the split band subassembly of FIG. 3, showing its constructional details;

FIG. 5 is a fragmentary, perspective view of a portion of the band subassembly of FIG. 3, showing details of a flexible hinge strip;

FIG. 6 is an enlarged, cross sectional view, similar to FIG. 2, illustrating constructional details of a second embodiment of the tank assembly;

DESCRIPTION OF THE PREFERRED EMBODIMENTS

Figure 7:
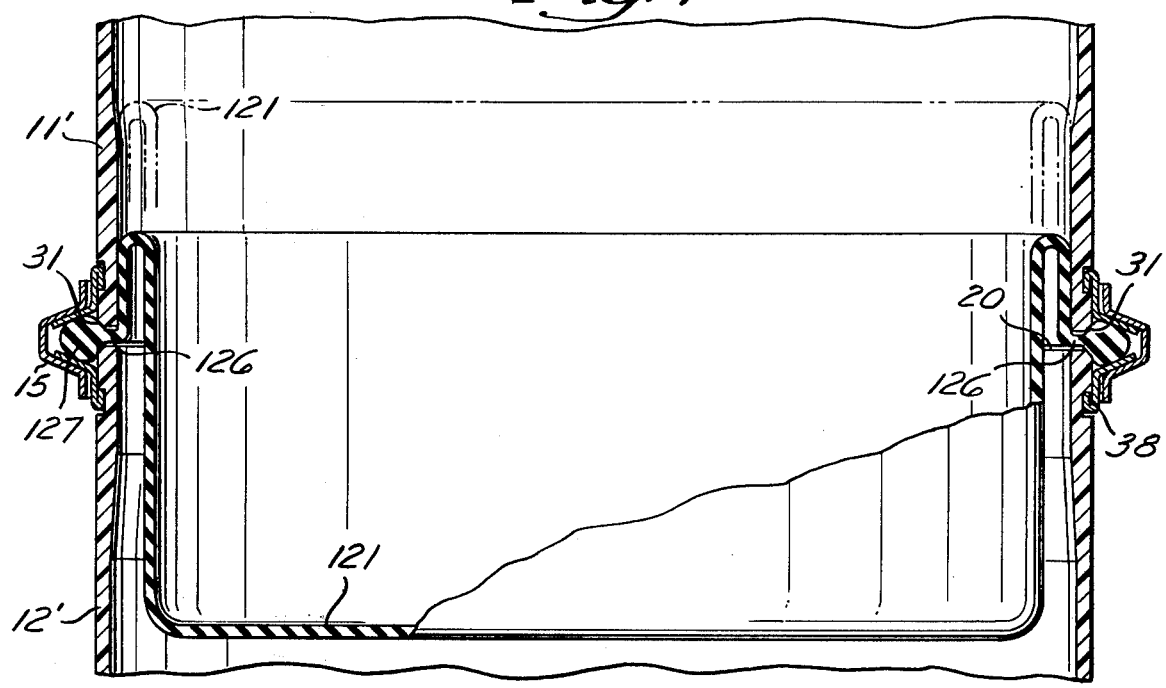
FIG. 7 is a cross sectional view of a portion of a tank assembly constructed in accordance with another embodiment of the invention, wherein the tank sections are internally isolated by a flexible wall.

Referring particularly to FIGS. 1 and 2, there is illustrated a split tank assembly 10 constructed in accordance with the principles of the invention. The assembly 10 includes a pair of mating tank sections 11 and 12 formed by transversely splitting an elongated tank having generally cylindrical sidewalls and domed end walls. Preferably, the tank is originally an integral bag-molded, glass-reinforced, closed tank such as that shown in the aforementioned Reissue U.S. Pat. No. 25,241, the disclosure of which is incorporated herein by reference. The tank assembly 10 also includes a pair of circumferential flanges 13 and 14, a closure band 15, and an O-ring seal or gasket 16.

As indicated in FIG. 1, the tank is severed at a transverse plane, preferably though not necessarily, near one or the other of its ends so that the tank sections 11 and 12 are of unequal lengths. The plane of separation defines opposed radial open faces 19 and 20 of the upper and lower tank sections 11 and 12, respectively. In this instance, the longer section 12 may be considered, for example, as a receptacle for a filter medium for fluids passing through the tank and the shorter section 11 as a closure member for the receptacle. One or both sections 11 and 12 may be provided with a port for introduction and discharge of fluid into the interior of the assembly. In FIG. 1, a port 23 is provided at the top center of the upper section 11.

Exterior surfaces 26 and 27 of the tank section sidewalls are generally cylindrical and of equal diameter. Substantially identical circumferential grooves 28 are cut, in a manner to be described, on these exterior surfaces 26 and 27. The grooves 28 on each section 11 and 12 preferably are of the same spacing from their associated end faces 19 and 20. The sidewalls of the upper and lower tank sections 11 and 12 are somewhat thickened along an axial zone extending from their respective end faces 19 and 20 beyond the grooves 28 to ensure that adequate strength resides in these sections subsequent to the cutting of the grooves. When the tank sections are formed by bag-molding, this additional wall thickness may be provided by disposing additional reinforcing fibers in this zone prior to introduction of the bag. The wall area remaining radially inside the grooves after the latter are cut must retain sufficient strength against axial forces developed by pressure within the tank tending to separate these sections, while the spacing of the grooves 28 from their respective end faces 19 and 20 must be sufficient to provide adequate area to avoid failure through shear under this axial pressure force. The grooves 28 are rectangular in cross section so as to provide abutment surfaces 29 lying in planes parallel to and facing rearwardly from the respective end faces 19 and 20. The outer surfaces of the tank sections 11 and 12 are beveled at 31 adjacent the end faces 19, 20 to provide sealing seats for the O-ring 16.

The circumferential flanges 13 and 14 are preferably identical, and are unitary elements having a single radial split (not shown) to permit elastic expansion over the cylindrical walls 26 and 27 and contraction into their respective grooves 28. Each flange includes a conical skirt portion 36 and an integral cylindrical portion 37. The cylindrical portion 37 includes a reverse fold 38 at its distal edge to form a shoulder 39 to axially retain its associated tank section by engagement with the groove abutment surface 29. Ideally, the flanges 13 and 14 are formed from sheet stock of a suitable grade of stainless steel for corrosion resistance, and are rolled into their illustrated cross sectional shape and circumferential configuration. The free inside diameter of the cylindrical flange portion 37 is substantially equal to or slightly less than the diameter of the cylindrical outer tank surfaces 26 and 27. After being expanded over a tank section, a flange 13 or 14 is provisionally self-retained on the associated tank section when the reverse fold of the cylindrical portion 37 is released into a groove 28. The flange skirt portions 36 are spaced rearwardly from the associated tank end faces 19 and 20 so that they cooperate to define therebetween with the outer surface of the tank sections an annular space in which the O-ring 16 is retained.

Referring to FIGS. 3 through 5, the closure band 15 comprises a pair of semicircular segments 41 and 42 joined at one end by a flexible strip hinge 43 suitably welded or otherwise fixed to the adjacent ends of the segments. At their opposite ends, the segments 41 and 42 are connected by a threaded bolt 44. The bolt is assembled through U-shaped elements 45 welded on ends of the segments 41 and 42. Preferably, the band subassembly 15 is formed of corrosion-resistant stainless steel.

As shown most clearly in FIG. 2, the band segments 41, 42 have a generally trapezoidal cross section including an outer wall portion 46 and canted or conical wall portions 47. Short cylindrical flanges or ribs 48 extend axially from the canted wall portions 47 of the segments 41 and 42. The included angle of the canted wall portions 47, for example about 40 degrees, is complementary to the angle formed by the flange skirts 36. The band subassembly 15 is positioned around the tank sections 11 and 12 and associated flanges 13 and 14 by separating the segments 41 and 42 through elastic flexure of the strip 43. The bolt 44 may then be installed and tightened.

The O-ring 16 is formed of relatively soft elastomeric material, for example, approximately 40 durometer, and preferably has a circular cross section. The O-ring is dimensioned such that its inside diameter in its free state is approximately equal to the mean diameter of the beveled surfaces 31 or, in other words, slightly less than the diameter of the outer cylindrical tank surfaces 26 and 27. The various elements of the tank assembly 10 are illustrated approximately to scale. As shown, by way of comparison, the O-ring is relatively large in cross sectional diameter in comparison to the nominal thickness of the tank wall section.

The clamp assembly 15 is tightened to produce a wedge action on the flange skirt portions 36 to draw the flanges 13 and 14, and therefore the tank sections 11 and 12, axially together. The O-ring is axially compressed between the flange skirts 36. This compression causes the O-ring to be distorted into tight sealing engagement with the beveled edges 31 of the tank sections 11 and 12.

Figure 8:
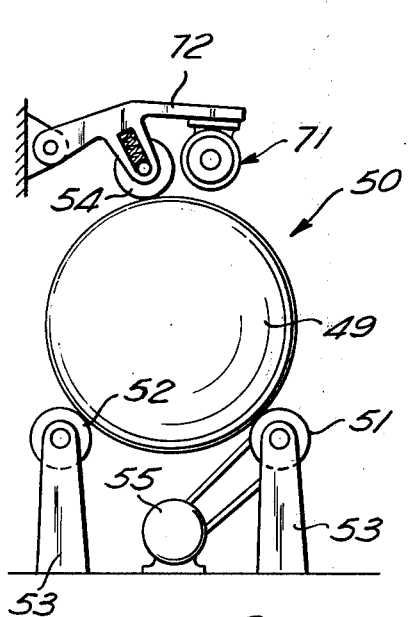
FIG. 8 is a somewhat schematic, axial end view of apparatus for machining the tanks of FIGS. 1, 2, and 7.
Figure 9:
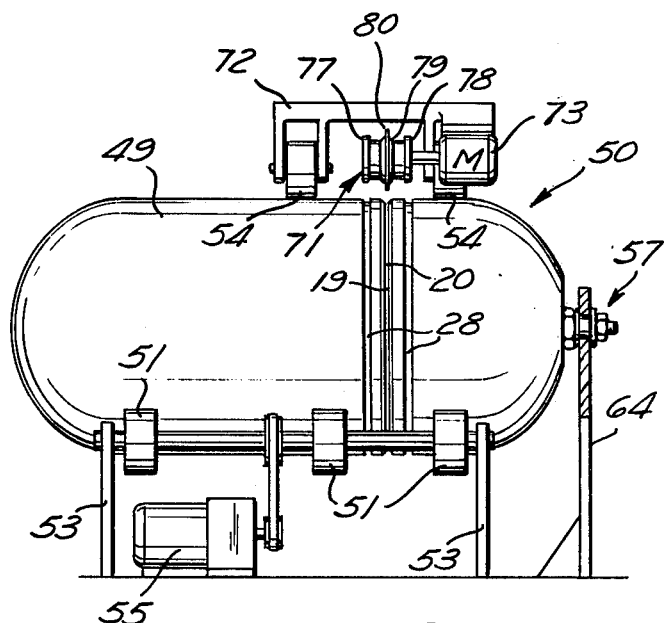
FIG. 9 is a side elevational view of the apparatus of FIG. 8.
Figure 10:
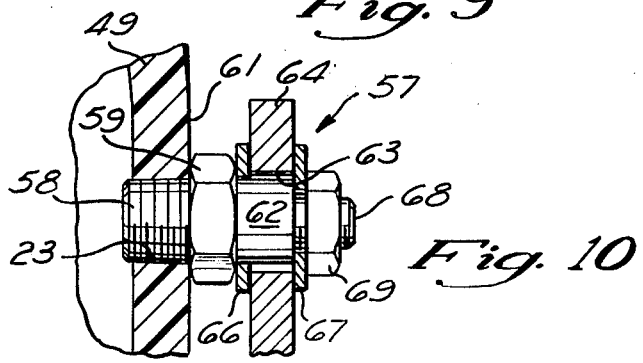
FIG. 10 is an enlarged, cross sectional view of a portion of the apparatus and tank illustrated in FIG. 9.

FIGS. 8 through 10 illustrate a preferred manner of making the tank sections 11 and 12 of FIGS. 1 and 2. An integral tank 49 is positioned in a work station indicated generally at 50. The work station 50 includes a set of support rollers 51 and 52, rotatably mounted on supports 53. At least one set of rollers 51 is rotatably driven by a gear reducing motor 55 so that, through friction, the rollers cause the tank to rotate about its longitudinal axis. An upper set of rollers 54 spring-biased vertically downwardly maintains the tank 49 in positive engagement with the support rollers 51 and 52.

With particular reference to FIG. 10, the tank 49 is axially located in the work station 50 by a rotary coupling, indicated generally at 57. The rotary coupling 57 includes a threaded extension 58 tightened into the threaded tank port 23 until an adjacent shoulder 59, provided with wrenching flats, tightly abuts the apex, designated 61, of the tank such that there is no axial free movement between the tank and the coupling 57. A cylindrical portion 62 of the coupling extends through a clearance hole 63 in a fixed plate 64. Thrust washers 66 and 67 are assembled on the cylindrical portion 62 and a threaded stud 68 on opposite sides of the plate 64. The washer 67 is retained against the cylindrical portion by a nut 69 tightened on the threaded stud 68. The length of the cylindrical portion 62 of the coupling assembly is dimensioned such that minimal clearance is provided for the plate 64 between the washers 66 and 67 so that substantially no axial relative movement between the coupling assembly 57 and the stationary plate 64 is possible. The tank 49 is thereby restrained against axial movement while it is permitted to rotate about its longitudinal axis. The diametral clearance of the cylindrical portion 62 of the coupling assembly 57 in the hole 63 accommodates any tolerance associated with the diameter and concentricity of the sidewalls of the tank 49.

A rotary cutter 71 is pivotally mounted on an arm 72 for movement relative to the tank 49 in a plane corresponding to the desired transverse plane of separation of the tank into the sections 11 and 12 of FIGS. 1 and 2. A motor 73, also mounted on the arm 72, drives the rotary cutter or tool 71. The spring-loaded upper rollers 54 are supported on the cutter arm 72. As viewed in FIG. 8, the rollers 54 and rotary cutter 71 are in a retracted position, permitting loading of the tank 49 in the work station for connection with the rotary couplings 57.

The tank is caused to rotate about its longitudinal axis through rotation of the drive rollers 51 upon energization of the gear reducing motor 55. The arm 72 is lowered to bring the spring-loaded idler rollers 54 into contact with the tank 49 to hold the tank in positive engagement with the drive rollers 51 and additional idler rollers 52. The rotary cutter is caused to operate at a high rate of rotation by its associated motor 73 when brought into contact with the tank 49. As shown in FIG. 9, the cutter, which may be a unitary body or a stack of appropriately configured cutters is provided with axially spaced cutting surfaces 77 through 79, which correspond exactly in profile to the shape of the desired grooves 28 and bevel 31. The central surface area 79 of the cutter 71 includes a cut-off portion 80 projecting sufficiently far from the remaining portions of the cutter 71 to completely sever through the wall of the tank 49. The disclosed use of a single cutter 71, with all of its elements 77–80 fixed relative to one another, permits the grooves 28 and beveled surfaces 31 to be formed with close dimensional tolerances with respect to one another. Thus, independent of the dimensional variations in the construction of the tank 49 itself, it will be appreciated that the spacing of the grooves 28, their associated beveled surfaces 31, and the plane of separation therebetween will be uniform from one tank to the next so that the upper section 11 of one tank and the lower section 12 of another tank may be readily mated without dimensional problems.

Figure 11:
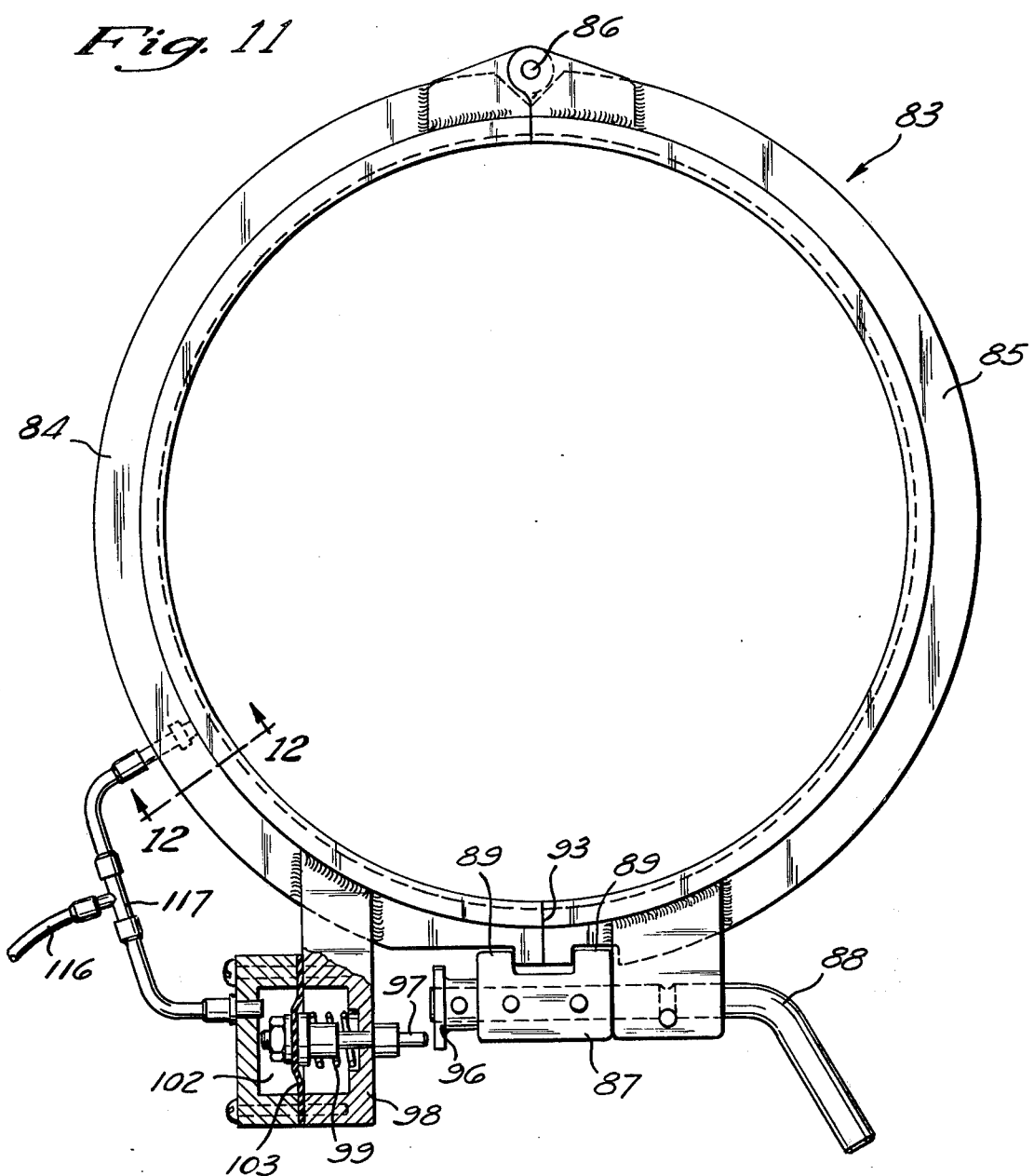
FIG. 11 is a plan view of a test ring assembly for testing tanks to be used in the assembly of FIGS. 1, 2, and 7.
Figure 12:
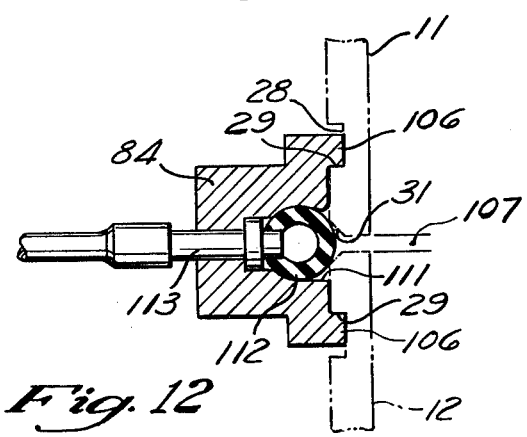
FIG. 12 is a fragmentary, cross sectional view of the test ring of FIG. 11 taken along the line 12—12.
Figure 13:
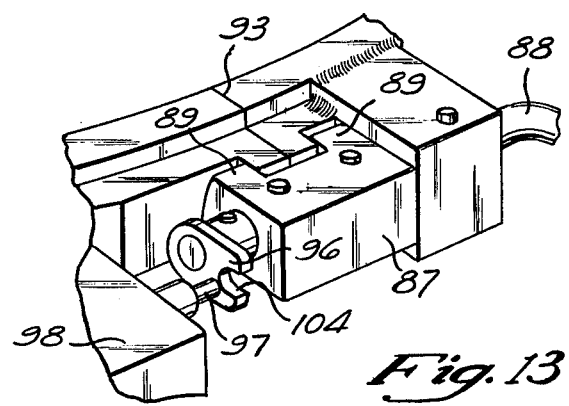
FIG. 13 is a perspective view of a portion of the test ring of FIG. 11, showing details of a latch interlock feature thereof.

FIGS. 11 through 13 illustrate apparatus 83 for testing the integrity of the tank sections 11 and 12 as produced by the rotary cutter 71. The apparatus 83 includes a pair of semicircular segments 84 and 85 which are adapted to fit over the circumference of the tank sections 11 and 12. The segments 84 and 85 are joined at one end by a hinge 86. At the opposite end, the segments 84 and 85 are locked together by a latching block 87. The block 87, which is rotatably supported with a manually operated rod 88, is formed with a pair of integral extensions 89. In the position illustrated in FIGS. 11 and 13, the extensions 89 embrace projecting areas of the segments 84 and 85 to prevent separation of the segments at the radial plane of separation designated 93.

Pinned to the operating rod 88 is a safety latch 96. In the illustrated position of FIGS. 11 and 13, the latch 96 is in registration with a locking pin 97 supported for movement in a direction generally parallel to the axis of rotation of the rod 88 by a housing 98 welded or otherwise fixed to the adjacent ring segment 84. The pin 97 is biased to its illustrated position by a compression spring 99 and is adapted to be driven rightwardly, as viewed in the figures, when a chamber 102 is pressurized to exert a force on a diaphragm 103 to which the pin 97 is secured. At a rightward position (not shown) the pin 97 enters a notch 104 on the safety latch 96, thereby preventing movement of the latching block 87 by operation of the rod 88.

As indicated in FIG. 12, the cross section of the semicircular segments 84 and 85 is adapted to complement the exterior configuration of the tank indicated in phantom. The segments 84 and 85 each include a pair of inwardly extending, circumferential ribs 106 adapted to be received in the circumferential grooves 28 of the tank sections 11 and 12. The flanges or ribs 106 are axially spaced such that by engagement with the abutment surfaces 29 of the grooves 28, they maintain the tank sections at a relative axial spacing 107 substantially equal to that existing in the assembly illustrated in FIG. 2. Each of the segments 84 and 85 includes a circumferentially extending inner recess or groove 111. A circumferentially continuous elastomeric tube 112 is disposed within the recess 111. A fitting 113 extends radially from segment 84 to provide fluid communication to the interior of the tube 112.

Fluid pressurization of the tube 112 through the fitting 113 causes it to expand into tight engagement with the beveled tank surfaces 31, thereby substituting for the function of the O-ring 16. With the plane of separation between the tanks 11 and 12 thereby sealed by the tube 112, the tank sections 11 and 12 may be tested against leakage or other structural faults by immersing the tank under a liquid while it is internally pressurized by introducing pressurized fluid, such as air, through its port 23. In this manner, any leakage paths which might result from manufacturing defects in the tank or from machining operations of the rotary cutter 71 in forming the grooves 28 and bevels 31 are revealed by evidence of bubbles rising from the tank sections 11 and 12 through the liquid in which it is immersed. Possible defects which may be discovered are delamination of fibers in the area of the grooves 28 and bevel surfaces 31 or imperfect bevel surfaces 31 which would prevent adequate seating of the tube 112 and therefore the O-ring 16. Where desired, the bevel surfaces 31 may be sealed by a suitable nonporous coating, such as an air-drying acrylic coating, to avoid leakage through these surfaces as a result of the slight porosity characteristic of machined fiber-reinforced plastic surfaces.

The fitting 113 is pressurized with air or any other suitable fluid through a supply line 116. A T-fitting 117 to which the supply line 116 and tube fitting 113 are connected assures that the diaphragm chamber 102 will be pressurized whenever the tube 112 is pressurized. The aforementioned displacement of the pin 97 into interlocking relationship with the slot 104 associated with the latching block 87 protects against inadvertent operation of the control rod 88 while the tube 112 is pressurized, thereby avoiding uncontrolled opening of the segments 84 and 85 upon rotation of the block extensions 89 out of engagement of the segment projections 91 and 92 and overexpansion of the tube 112.

FIG. 7 illustrates a modification of the tank assembly of FIGS. 1 and 2, wherein the interior zones of the tank sections designated 11' and 12' are isolated by a flexible wall 121. In this embodiment, the flexible wall 121 is provided in the form of a rolling diaphragm, itself generally known to those skilled in the art. The diaphragm 121 has the form of a cup and, according to conventional practice, may be fabricated of fiber-reinforced, elastomeric material in order to maintain its shape. An open circumferential edge 126 of the diaphragm 121 is vulcanized or otherwise joined in fluidtight relation to a peripheral seal member 127 of circular cross section and analogous to the O-ring 16 of FIG. 2.

The plane of separation between the tank sections 11' and 12' may be more near the longitudinal center of the tank than that of FIG. 1, or at the center, to allow the diaphragm to move longitudinally through a stroke as long as possible. An intermediate position of the diaphragm 121 is illustrated in phantom in FIG. 7 where the sides of the diaphragm have been caused to roll upon themselves. The circumferential flanges 13 and 14 and closure band 15 have been designated by the same numerals as those of FIGS. 1 and 2, since these components may be substantially the same as the previously described embodiment. Preferably, the circumferential seal member 127 effects a seal on beveled surfaces 31 in the same manner as the O-ring 16, while the various elements are so proportioned that the end faces 19 and 20 have a spacing somewhat greater than the thickness of the diaphragm edge 126 to ensure adequate compression of the seal member by relative axial closing movement of the flanges 13 and 14.

The assembly of FIG. 7 is particularly suited for use where two fluids are to be kept isolated from one another within the tank. A typical application of this structure is an accumulator for domestic water storage systems, where air is maintained at a pressure on one side of the diaphragm 121 while water is disposed on the opposite side. Ordinarily, in such use both tank sections 11' and 12' are provided with individual ports.

In FIG. 6, there is shown another embodiment of the invention. As in the previous embodiments, cylindrical tank sections 131 and 132 are fabricated by transversely severing an integral bag-molded, fiber-reinforced tank such as that described in the aforementioned patents. In this embodiment, however, a pair of substantially identical flanges 133 are bonded to the exterior surfaces of the tank sections 131 and 132. The sidewalls of the tank sections 131 and 132 illustrated in FIG. 6 correspond to those illustrated in the embodiment of FIG. 2 but need not be reinforced by additional wall thickness since the bonding assembly of the flanges 133 avoids the necessity of grooving the sidewalls. The tank sections 131, 132 may be formed by cutting through a tank with a conventional cut-off tool or other appropriate means.

The flanges 133 preferably are molded as circumferentially continuous rings of fiber-reinforced, plastic material, which may be the same as or similar to the material of the tank sections 131 and 132. The flanges 133 include integral, cylindrical portions 135 and radial skirt portions 136. As seen, a leading surface 137 of the skirt portion 136 is generally conical and analogous to the forward surface of the skirt portion 36 of the metal flanges of FIGS. 1 and 2. The bore, designated 138, of the flanges 133 is slightly tapered outwardly in a forward direction so that its major diameter is immediately adjacent the conical lead surface 137. The minor diameter of each flange 133 is approximately equal to the nominal outside diameter of the tank sections to enable it to be readily assembled over a tank section.

Each flange 133 preferably is bonded or locked to its associated tank section 131 or 132 by a suitable epoxy or other adhesive. This is ideally accomplished by applying a reactive epoxy mix in a circumferentially continuous band about the exterior of the tank sections in an axial width approximately equal to two-thirds of the length of a flange 133, but spaced slightly away from the end faces designated 141 and 142 of the tank sections 131 and 132 to assure that the outer surfaces of the tank sections 131 and 132 immediately adjacent these end faces do not become coated with bonding material upon installation of the flanges 133. After application of the epoxy bonding agent, a flange 133 is slipped over its associated tank section from the rearward end of the tank forwardly over the epoxy and finally adjacent the end face of the tank. The tapered bore 148 of the flange 133 tends to scoop up any thickness of excess bonding material resulting from an uneven application and ensures that a sufficient amount of the bonding material is distributed circumferentially about the tank section. Upon hardening, the bonding medium, designated 146, cooperates with the tapered bore in the manner of a taper lock to mechanically interlock a flange 133 to its associated tank section 131 or 132, thereby enhancing the adhesive strength of the bonding medium.

An O-ring 151 is disposed between the conical surfaces 137 of the opposed flanges 133. Like the O-ring 16 of the embodiment of FIG. 2, the O-ring 151 is circumferentially continuous about the exterior of the tank sections 131 and 132 and is relatively soft, e.g., 40 durometer. The inside diameter of the O-ring 151 is approximately equal to the outside diameter of the tank sections 131 and 132, desirably with a slight interference in order that the ring be frictionally retained on one of the tank sections 132 when the other section 131 and its flange are removed. As seen in FIG. 6, the lower flange 134 is displaced somewhat further from the end face 142 of its associated tank section 132 in comparison to the spacing of the flange associated with the upper tank section 131 and its associated end face 141. This arrangement permits the O-ring 151 to be provisionally retained on the outer surface of the lower tank section 132 when the upper tank section 131 is removed so that manual assembly of the tank sections in the field is facilitated by reducing the number of elements which must be simultaneously manipulated.

A closure band 153 is constructed in substantially the same manner as the band 15 illustrated in FIGS. 3 through 5, but is somewhat wider in axial length to accommodate the axial thickness of the flange skirt portions 136. As with the formerly described band 15, the band 153 is circumferentially split to permit it to be expanded over the flanges 133 and thereafter pulled tight by a draw bolt, such as the bolt 44 illustrated in FIG. 3, to cause the flanges 133 to be drawn axially together by wedging action of canted sides 156 operating on rearward faces 157 of the flange skirts 136. This drawing together of the flanges 133 causes a direct axial compression of the O-ring 151 to produce tight sealing engagement between the O-ring and forward conical surfaces 137 of the flanges 133, thereby sealing off the interior of the tank sections 131 and 132 from the exterior environment of the tank.

It is not necessary for the O-ring 151 to contact the wall surfaces of the tank sections 131 or 132 to effectively seal the interior of the tank, since the bonding agent 146 effectively eliminates any axial leakage paths between the flanges 133 and outer surfaces of the tank sections. It will also be understood that owing to the geometry of the conical flange surfaces 137, in service the actual contact force between these surfaces and the O-ring 151 will be generally increased in proportion to the pressure within the tank sections 131 and 132, since such pressure acts directly on the O-ring to expand it against these surfaces.

Although for purposes of illustration in the various embodiments herein disclosed, an elongated tank having generally cylindrical sidewalls has been disclosed, it will be understood that certain aspects of the invention may be put to advantage with other tank configurations, such as spherical or nearly spherical assemblies, and that various modifications and rearrangements of parts may be resorted to without departing from the scope of the invention.

What is claimed is:

1. A molded fiber-reinforced, plastic split tank assembly comprising a pair of tank sections having mating faces of substantially equal diameter in a transverse plane, said tank sections each having a generally uniform wall thickness and cylindrical sidewall portions of generally uniform outside diameter as produced by bag molding processes, each of said sections being provided with a nonintegral separately formed, external, circumferential flange adjacent its respective face, each of said flanges having a radially inwardly facing surface describing an inside diameter greater than the inside diameter of its respective tank section, means axially locking each of said flanges to its associated tank section, a circumferential split band encircling said flanges, said band having inwardly facing portions in abutting contact with rearward surfaces of said flanges, means for releaseably circumferentially tightening said band, said inwardly facing portions and said rearward flange surfaces being arranged to provide a wedging action therebetween to cause said sections to be drawn axially toward each other upon circumferential tightening of said band, a single O-ring disposed between said flanges and adapted to be compressed between opposed, forward faces of said flanges when said band is tightened, said O-ring being constructed and arranged with respect to said forward flange faces to seal the circumferential zone surrounding said opposed tank faces when compressed between said flanges, said radially inwardly facing surface of each flange forming an internal bore extending along a major portion of the axial length of the flange, said bore being tapered along a major portion of its length with increasing diameter in a direction towards its forward flange face, said axial locking means of each flange including a bonding medium disposed between the bore and sidewall along a major portion of the length of the bore.

2. A tank assembly as set forth in claim 1, wherein at least the major portion of said O-ring is radially outward of the outer surfaces of said tank sections.

3. A tank assembly as set forth in claim 2, wherein said O-ring is relatively soft and has an unstressed cross section relatively large in comparison to the wall thickness of said tank sections.

4. A tank assembly as set forth in claim 2, wherein said forward flange faces are conical, having a decreasing radius in a rearward direction whereby said forward flange faces are adapted to squeeze said O-ring radially inwardly.

5. A tank assembly as set forth in claim 4, wherein said inwardly facing band portions and said rearward flange surfaces have complementary, conical configurations to provide said wedging action.

6. A tank assembly as set forth in claim 1, wherein said flanges are plastic elements having integrally formed radial flange and axial ring portions.

7. An assembly as set forth in claim 6, wherein the flanges of each tank section are substantially identical, the flange of one tank being axially disposed relative to the associated face of the tank section a predetermined distance equal to or greater than zero and the flange of the second tank being spaced a second predetermined distance greater than the first distance from its associated tank face, said second predetermined distance being such that the forward end of the respective tank section projects a sufficient distance to retain said O-ring thereon when said tank sections are separated.

8. A tank assembly as set forth in claim 1, including an elastomeric diaphragm within said tank sections, said diaphragm having an outer periphery attached in fluid-tight relationship to said O-ring, whereby said diaphragm isolates the interior of each of said tank sections from that of the other.

9. A tank assembly as set forth in claim 8, wherein said diaphragm is cup-shaped and includes a cylindrical portion adapted to roll on itself during axial movement of an end wall thereof.

10. A molded fiber-reinforced plastic split tank assembly comprising a pair of tank sections having mating faces at a transverse plane, the sidewalls of each tank section having a substantially uniform outside diameter in a zone adjacent its respective face, a circumferential, external flange on each of said tank sections adjacent to the end face thereof, each of said flanges being molded of plastic in a circumferentially continuous ring, each of said flanges having an internal bore extending axially along a major portion of the length of the flange, bonding means securing said flanges on the exterior of said tank sections, said bonding means being disposed radially between said flanges and said tank sections in said bore along a major portion of the axial length of said flanges, said flanges each having a forward facing sealing surface, the bore of each flange being tapered along a major portion of its length outwardly from its associated tank sidewall in a forward direction towards said forward facing sealing surface, an O-ring seal on the exterior of the tank sections between said flanges, said O-ring sealingly engaging said flange sealing surfaces, and circumferential clamping means encircling and drawing said flanges axially together to squeeze said O-ring into tight sealing engagement with said sealing surfaces.

11. A tank assembly as set forth in claim 10, wherein said forward facing sealing surfaces are defined by shallow cones diverging outwardly in a forward direction, said conical configuration of said surfaces permitting said surfaces to radially retain said O-ring.

12. A tank assembly as set forth in claim 11, wherein said sealing surface of one of said flanges is spaced a greater distance from its associated tank section end face than the other flange from its associated tank section end face, whereby said O-ring may be provisionally retained on the exterior of the tank section of said one flange between the end face thereof and said sealing surface.

13. A tank assembly as set forth in claim 12, wherein said bonding means seals axial leakage paths between said flanges and said tank sections along said tapered bores.

* * * * *